A. LETHERT.
Trusses.

No. 148,718. Patented March 17, 1874.

Witnesses:
H. H. Dodge
Harry King

Inventor:
Anthony Lethert
by Dodge & Son
Attys.

UNITED STATES PATENT OFFICE.

ANTHONY LETHERT, OF SHAKOPEE, MINNESOTA.

IMPROVEMENT IN TRUSSES.

Specification forming part of Letters Patent No. 148,718, dated March 17, 1874; application filed February 17, 1874.

*To all whom it may concern:*

Be it known that I, ANTHONY LETHERT, of Shakopee, in the county of Scott and State of Minnesota, have invented certain Improvements in Trusses, of which the following is a specification:

My invention consists in attaching the pad of a truss by means of a socket in the arm, arranged to engage over the mouth of the socket in which the ball is held, the parts being clamped together by a screw, as hereinafter more fully described.

Figure 1:
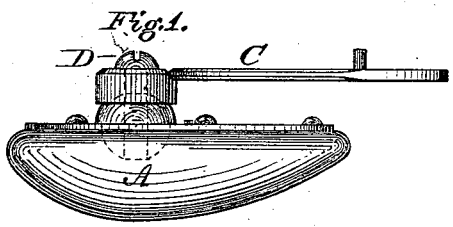
Figure 2:
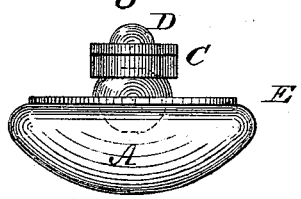
Figure 3:
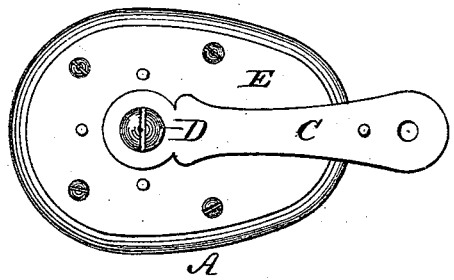

Figure 1 is a side view of a pad with my improved fastening, Fig. 2, an end view of the same; Fig. 3, a top-plan view; and Fig. 4, a longitudinal section, showing the different parts which enter into my improved fastening.

It is necessary that the pad shall be placed in different positions to suit the circumstances in different cases, and, for this purpose, many arrangements have been devised; but all these have failed to secure the desired object in a satisfactory manner.

The object of this invention is to produce a simple, cheap, and durable fastening, by which the pad may be readily adjusted, and securely held in place when adjusted.

Figure 4:
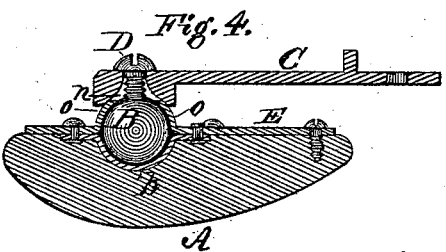

In the drawing, A represents the pad, in which is seated a hemispherical socket, $b$, of metal or other hard substance, to receive a sphere or ball, B. This ball is provided, at its upper side, with a hole to receive a screw, D, as hereafter explained. The ball being seated within its socket $b$, a top or cover, E, having a flange, $o$, turned up at the point at which it fits over the ball, is screwed or otherwise fastened on the pad. This flange $o$ is of semicircular form, in order to fit against the ball B, and is left open at the top, as shown in Fig. 4.

When the top or cover E is fastened in place, the flange $o$ engages over the ball B, and prevents its removal.

Having arranged the parts in the manner described, I next provide an arm, C, which has, at one end, a flanged opening, $n$, of such form and size as to fit a short distance down over the flange $o$, and secure the said arm to the ball B by means of a screw, D, passing through the opening $n$, and into the hole in the ball B before mentioned. The head of this screw D is of such size as to project over the sides of the opening $n$, as shown in Fig. 4, so that when the screw D is tightened it will hug the flange $n$ down against the flange $o$, at the same time drawing the ball B up against the flange $o$, thus securely and rigidly holding the arm C in whatever position it may be placed.

The ball-and-socket or universal joint allows the greatest nicety of adjustment, while the large bearing-surface afforded by the flanges $n$ and $o$ and the ball B affords a very efficient and secure means of holding the pad in any required position.

I am aware that a ball-and-socket joint has been used for this purpose before, the pad being sometimes secured or held in the required position by means of the screw which secured it to the arm passing through the ball, the end resting against the inner surface of the socket; and also that they have been held by means of extra screws and pins; and therefore I do not claim such. These forms are objectionable for various reasons: among others, where the screw passes through the ball, the bearing-surface obtained is not sufficient to hold the pad firmly; and, where pins or extra screws are used, they are necessarily small, and are, therefore, frequently lost, besides increasing the expense of manufacture.

Having thus described my invention, what I claim is—

The arm C, provided with the flanged socket or opening $n$, arranged to engage over the flange $o$ of the socket that secures the ball to the pad, in combination with the ball B and screw D, all constructed and arranged to operate as set forth.

ANTHONY LETHERT.

Witnesses:
JOSEPH PLONNON,
HERMAN BAUMHAGER.